US009587533B2

(12) United States Patent
Noguchi

(10) Patent No.: US 9,587,533 B2
(45) Date of Patent: Mar. 7, 2017

(54) OIL LEVEL DISPLAY DEVICE OF ENGINE

(71) Applicant: Fuji Jukogyo Kabushiki Kaisha, Tokyo (JP)

(72) Inventor: Masanori Noguchi, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 198 days.

(21) Appl. No.: 14/337,946

(22) Filed: Jul. 22, 2014

(65) Prior Publication Data

US 2015/0040817 A1 Feb. 12, 2015

(30) Foreign Application Priority Data

Aug. 9, 2013 (JP) .................................. 2013-166483

(51) Int. Cl.
*F01M 11/12* (2006.01)
*G01F 23/66* (2006.01)
*F16N 19/00* (2006.01)

(52) U.S. Cl.
CPC ............ *F01M 11/12* (2013.01); *G01F 23/66* (2013.01); *F16N 19/003* (2013.01)

(58) Field of Classification Search
CPC ........ F01M 11/12; G01F 23/66; F16N 19/003
USPC .............. 116/227–228; 33/346, 365, 366.15, 33/366.17, 366.18, 721–722
See application file for complete search history.

(56) References Cited

U.S. PATENT DOCUMENTS

| 1,432,385 | A | * | 10/1922 | Conners | G01F 23/34 116/109 |
| 1,435,986 | A | * | 11/1922 | Scoville | G01F 23/58 116/228 |
| 1,522,355 | A | * | 1/1925 | Winterhoff | G01F 23/36 123/41.15 |
| 1,663,483 | A | * | 3/1928 | Pierce | G01F 23/42 73/306 |
| 1,717,188 | A | * | 6/1929 | Ciomei | F01M 11/0408 137/559 |
| 2,329,412 | A | * | 9/1943 | Nelson | G01F 23/292 116/227 |
| 2,624,821 | A | * | 1/1953 | McCandless | G01F 23/36 338/141 |
| RE25,208 | E | * | 7/1962 | Perkins | G01F 23/60 73/313 |

(Continued)

FOREIGN PATENT DOCUMENTS

| CN | 102 852 592 | 1/2013 |
| JP | 2003-201819 | 7/2003 |

(Continued)

*Primary Examiner* — R. A. Smith
*Assistant Examiner* — Tania Courson
(74) *Attorney, Agent, or Firm* — Smith, Gambrell & Russell, LLP

(57) ABSTRACT

An oil level display device is fitted such that a float guide accommodating a float is attached to an oil filler neck and is plugged with a float cap. To check the amount of oil, the float cap is removed and the position of the float is checked. If a sufficient amount of oil is stored, an upward force derived from oil buoyancy is larger than a downward force of the own weight of the float, from among the forces that act on the float. The float thus protrudes beyond a large-diameter portion upon removal of the float cap from the float guide.

20 Claims, 5 Drawing Sheets

(56) References Cited

U.S. PATENT DOCUMENTS

| | | | | |
|---|---|---|---|---|
| 3,316,647 A * | 5/1967 | Swallert | ............... | G01F 23/04 |
| | | | | 33/722 |
| 3,474,884 A * | 10/1969 | Braun | ............... | F16N 19/003 |
| | | | | 184/109 |
| 3,662,470 A * | 5/1972 | Sasgen | ............... | G01F 23/04 |
| | | | | 33/731 |
| 3,710,613 A * | 1/1973 | Innes | ............... | F22B 37/425 |
| | | | | 335/205 |
| 4,184,370 A * | 1/1980 | Schlick | ............... | G01F 23/36 |
| | | | | 338/33 |
| 4,441,364 A * | 4/1984 | Montie | ............... | G01F 23/36 |
| | | | | 73/313 |
| 4,991,434 A * | 2/1991 | Snow | ............... | G01F 23/04 |
| | | | | 33/717 |
| 5,765,435 A * | 6/1998 | Grotschel | ............... | G01F 23/36 |
| | | | | 73/313 |
| D430,050 S * | 8/2000 | Housey | ............... | D10/101 |
| 6,541,758 B2 * | 4/2003 | Yashiro | ............... | G01F 23/686 |
| | | | | 250/227.14 |
| 6,724,201 B2 * | 4/2004 | Sato | ............... | G01F 23/363 |
| | | | | 324/699 |
| 6,926,121 B2 * | 8/2005 | Gates | ............... | F01M 11/064 |
| | | | | 184/88.1 |
| 2003/0183002 A1 * | 10/2003 | Burger | ............... | G01F 23/76 |
| | | | | 73/313 |
| 2004/0065512 A1 | 4/2004 | Gates et al. | | |
| 2006/0139177 A1 * | 6/2006 | Gomery | ............... | G01F 23/04 |
| | | | | 340/624 |
| 2010/0315246 A1 * | 12/2010 | Gilpatrick | ............... | G01F 23/04 |
| | | | | 340/623 |
| 2013/0125809 A1 * | 5/2013 | Gracyalny | ............... | G01F 23/58 |
| | | | | 116/228 |
| 2015/0177050 A1 * | 6/2015 | Taylor | ............... | G01F 23/76 |
| | | | | 73/305 |
| 2016/0069726 A1 * | 3/2016 | Pettigrew | ............... | G01F 23/64 |
| | | | | 33/722 |

FOREIGN PATENT DOCUMENTS

| | | |
|---|---|---|
| JP | 2004-340635 | 12/2004 |
| JP | 2005-134256 | 5/2005 |
| JP | 2007-211744 | 8/2007 |
| JP | 2007-224762 | 9/2007 |
| JP | 2008-111403 | 5/2008 |

* cited by examiner

OIL LEVEL DISPLAY DEVICE OF ENGINE

CROSS-REFERENCE TO RELATED APPLICATIONS

The present application claims priority from Japanese Patent Application No. 2013-166483 filed on Aug. 9, 2013, the entire contents of which are hereby incorporated by reference.

BACKGROUND

1. Technical Field

The present invention relates to an oil level display device of an engine that allows visually checking an amount of oil, without insertion or removal of an oil level gauge.

2. Related Art

Generally, an oil level gauge is pulled out of an oil filler tube that is provided vertically on an oil pan of an engine, and the amount of lubricant oil stored in the oil pan is checked on the basis of the position of oil adhered to the gauge body at the leading end of the gauge. Such oil level gauges have a drawback in that the operator must insert and remove manually the gauge in order to check the amount of oil. In particular, when various devices are disposed around the engine, the position of the oil level gauge is at the bottom and thus difficult to reach, whereby workability becomes poor.

Accordingly, the applicants had proposed, in Japanese Unexamined Patent Application Publication (JP-A) No. 2005-134256, an oil level display device that is provided with a float that moves up and down in accordance with an oil level, a marker that is connected to the float, and a transparent cover that is provided on the crank case of an engine and has the marker built thereinto. As a result, the amount of oil can be easily checked visually without the need for complicated operations of inserting and removing an oil level gauge.

While the oil level display device disclosed in JP-A No. 2005-134256 can remove complicated operations such as gauge insertion and removal incurred in conventional oil level gauges can thus be dispensed with, the oil level display device is not compatible with conventional oil level gauges, and requires a new design and new installation. This may result in an increase in cost and cause a problem in engine mounting layout.

SUMMARY OF THE INVENTION

In the light of the above, it is an object of the present invention to provide an oil level display device of an engine that reduces complicated operations such as insertion and removal of a conventional oil level gauge while securing compatibility with a conventional oil level gauge, and that enables reliable visual checking of the amount of oil.

An aspect of the present invention provides an oil level display device of an engine including a float; a float guide; and a float cap. The float moves up and down in accordance with an oil level of oil stored in an oil pan of an engine. The float guide has a housing unit of the float and is removably attached to a filler neck for replenishing oil into the oil pan. The housing unit constitutes a motion guide of the up-and-down motion of the float. The float cap is attached to the float guide and plugs an upper opening of the housing unit.

DETAILED DESCRIPTION

Figure 1:
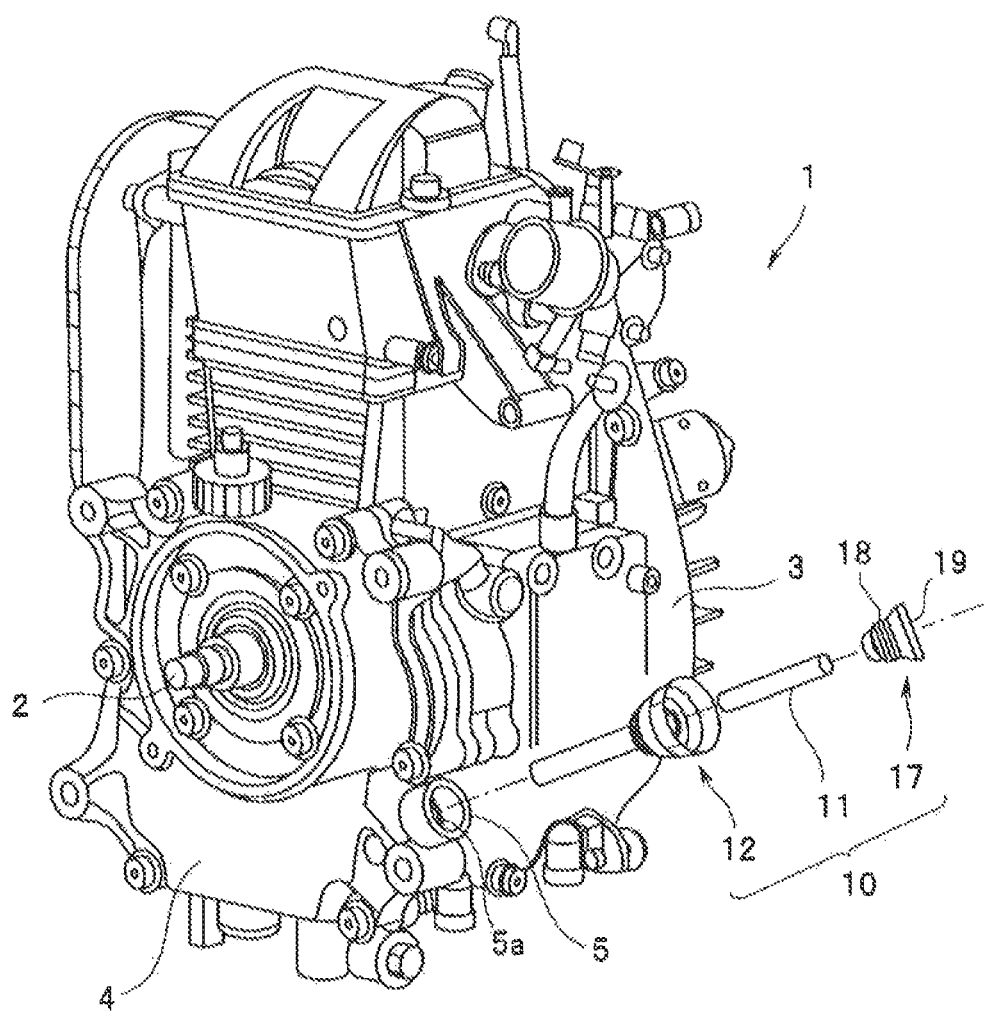
FIG. 1 is a perspective-view diagram of an engine and of an oil level display device.

Examples of the present invention are explained next with reference to accompanying drawings. In FIG. 1, the reference symbol 1 denotes a utility engine that is used, as a prime mover, in, for instance, generators, working equipment, snowmobiles or the like. In the figure, the engine is an engine for construction machinery, such as a rammer or the like. An oil pan 4 that stores oil for lubricating various units is formed at the bottom of a crank case 3 that supports a crankshaft 2 of the engine 1. The oil stored in the oil pan 4, is supplied, in the form of oil spray or mist, to a cylinder inner wall, the crankshaft 2, and a valve operating mechanism of the cylinder head, among others.

Oil within the oil pan 4 is replenished through an oil filler neck 5 that is provided on the upper side of the oil pan 4. The amount of oil in the oil pan 4 can be easily checked visually using an oil level display device 10 that is fitted to the oil filler neck 5. The configuration of the oil level display device 10 has been conceived as an alternative to that of conventional oil level gauges in which the amount of oil is checked on the basis of the position of oil adhered to the gauge body at the leading end. The oil level display device 10 can be easily used by simply substituting for a conventional oil filler cap provided with an oil level gauge and fitted to an already existing oil filler neck 5, or substituting for a simple oil filler cap having no oil level gauge.

Specifically, the oil level display device 10 comprises a float 11, which constitutes a marker that denotes an amount of oil, by moving due to buoyancy in oil, a float guide 12 that accommodates the float 11 in the interior thereof and that guides the displacement of the float 11 in accordance with the oil level, and a float cap 17 that is screwed to the inlet side of the float guide 12 and that plugs the upper opening of the float guide 12.

Figure 3:
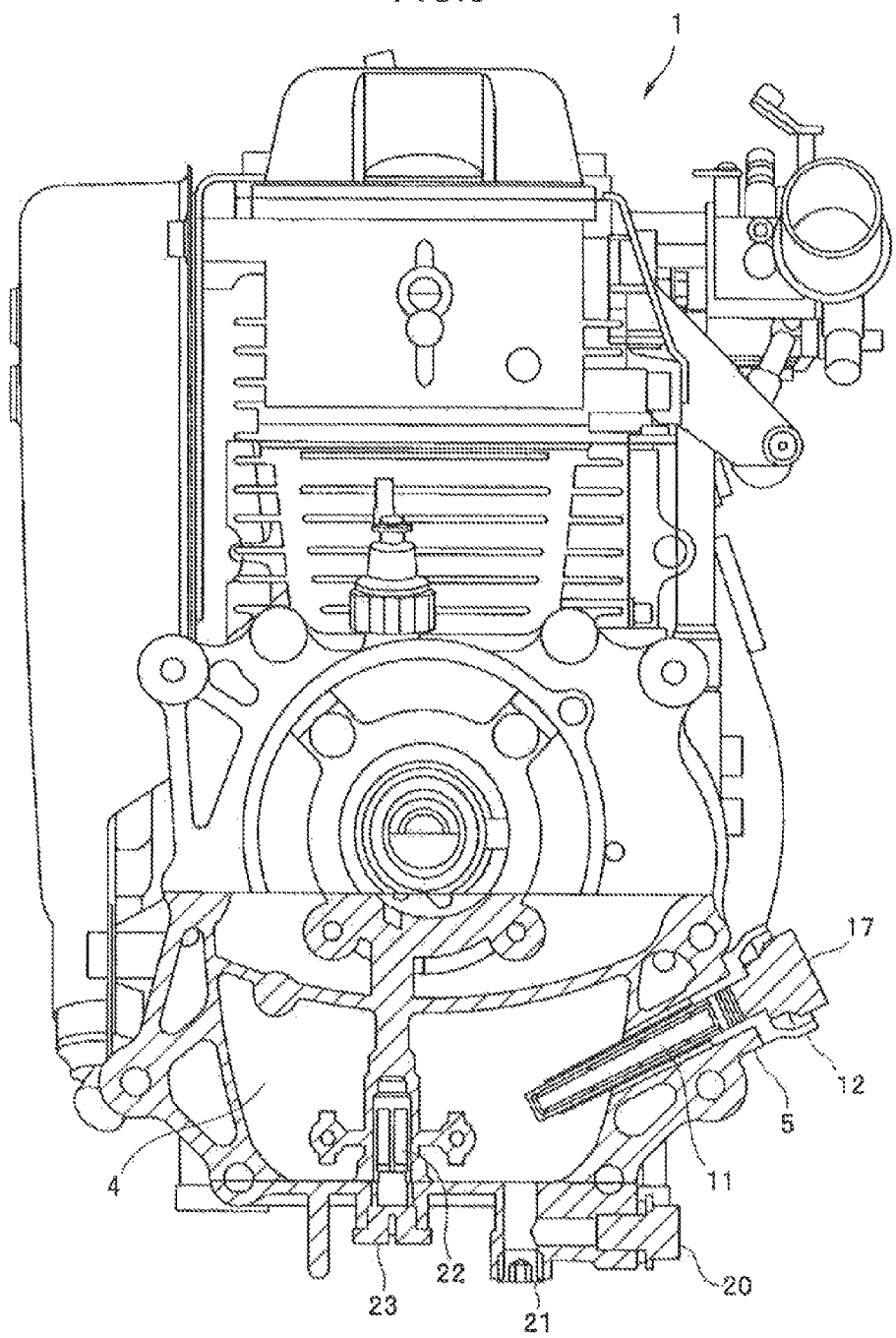
FIG. 3 is a partial cross-sectional diagram of an engine fitted with an oil level display device.

In the present example, the float 11 is formed, out of a resin, to an elongate cylindrical shape, and so as to have a closed-space hollow interior, in order to secure buoyancy in oil (see FIG. 3). The shape of the float 11 need not be necessarily an elongate cylindrical shape, and may be any shape, so long as the up-and-down displacement of the float 11 in accordance with the oil level can be checked visually. Accordingly, the float 11 may adopt the form of one or a plurality of spherical bodies (see float 11A in FIG. 7). The interior of the float 11 need not necessarily be hollow, and the float 11 may be formed out of a material lightweight enough to secure buoyancy, for instance a foam or the like.

Figure 2:
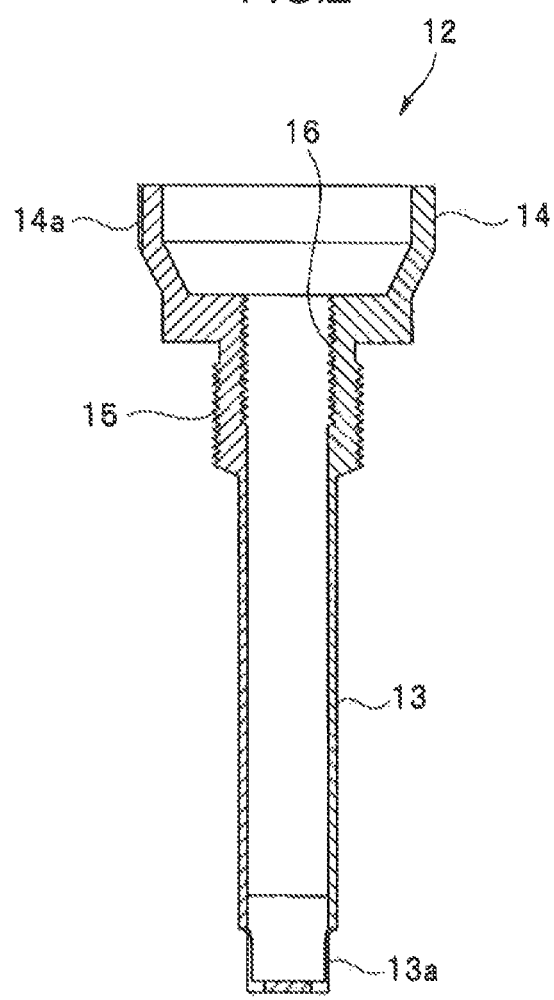
FIG. 2 is a cross-sectional diagram of a float guide.

As illustrated in FIG. 2, the float guide 12 is mainly made up of an elongate and hollow cylindrical guide tube 13 that accommodates the float 11, and a large-diameter cup-shaped large-diameter portion 14 opened upward, on the base side of the guide tube 13. Preferably, at least the guide tube 13 in the float guide 12 is translucent, so as to allow the presence or absence of the float 11 inside the float guide 12 to be checked easily.

An opening 13a for introduction of oil into the guide tube 13 is opened at the leading end of the guide tube 13 that is exposed in the oil pan 4. To prevent the float 11 from coming off, the opening 13a is opened in the side face of the leading end of the guide tube 13. The opening 13a may be provided on the bottom face side of the leading end of the guide tube 13, so long as the float 11 can be prevented from coming off.

A male thread 15, which is screwed onto a female thread 5a that is provided on the inner wall of the oil filler neck 5, is provided at the outer periphery of the guide tube 13, from the base side over the large-diameter portion 14. A female thread 16 onto which the float cap 17 is screwed is provided on the inlet-side inner wall face of the guide tube 13 that opens to the bottom face of the large-diameter portion 14.

The large-diameter portion 14 doubles also as a grip for attaching and detaching the float guide 12 to/from the oil filler neck 5. Slip stops 14a are provided at a plurality of sites on the outer peripheral face of the large-diameter portion 14, so as to facilitate gripping and twisting.

The float cap 17 comprises a male thread 13 that is screwed onto the female thread 16 through insertion into the large-diameter portion 14 of the float guide 12, and a grip 19 that is provided on the base side of the male thread 18. In the present example, the grip 19 is formed as a flat plate-like lug erected on the male thread 18, in the axial direction.

As illustrated in FIG. 3, the oil level display device 10 is fitted, instead of a conventional oil level gauge, to the oil filler neck 5 of the engine 1. To fit the oil level display device 10, firstly the float guide 12 is inserted into the oil filler neck 5, and then the float guide 12 is fixed through screwing of the male thread 15 onto the female thread 5a of the oil filler neck 5.

The float 11 is herein accommodated beforehand in the float guide 12; alternatively, the float guide 12 is screwed onto and fixed to the oil filler neck 5, and thereafter, the float 11 is inserted into and accommodated in the guide tube 13. Ordinarily, the male thread 18 of the float cab 17 is screwed onto the female thread 16 on the guide tube 13 inlet side; as a result, the base-side bearing surface of the male thread 18 is caused to abut, and be in close contact with, the interior of the large-diameter portion 14; oil is thus prevented from flowing out of the oil pan 4, while dust is prevented from intruding from outside.

Figure 4:
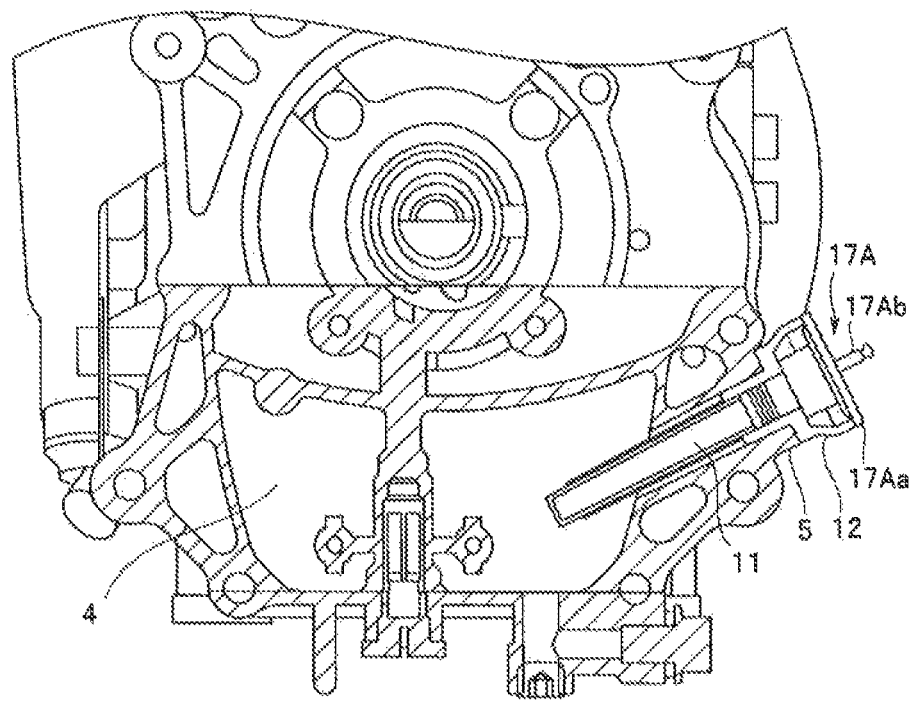
FIG. 4 is an explanatory diagram illustrating a variation of a float cap.

In this case, the float cap 17 may be in the form of a float cap 17A that has a flange 17Aa that abuts an opening end of the large-diameter portion 14 of the float guide 12, as illustrated in FIG. 4. Dust can be prevented more reliably from intruding by covering the entirety of the top of the float guide 12 with the flange 17Aa, using the float cap 17A. A grip 17Ab of the float cap 17A is identical to the grip 19 of the float cap 17.

Drain holes for oil draining are provided at the bottom of the oil pan 4. The drain holes are plugged by plugs 20, 21. A passage connected to an oil pump is provided, at the bottom of the oil pan 4, for sucking oil via a filter 22. This passage is plugged by a plug 23.

To check the amount of oil in the oil pan 4, the float cap 17 is removed from the float guide 12, and the position of the float 11 is checked. The float 11 moves diagonally up and down within the float guide 12 in accordance with the oil level of the oil pan 4. Therefore, the storage amount of oil can be easily grasped by just visually checking the position of the float 11.

Figure 5:
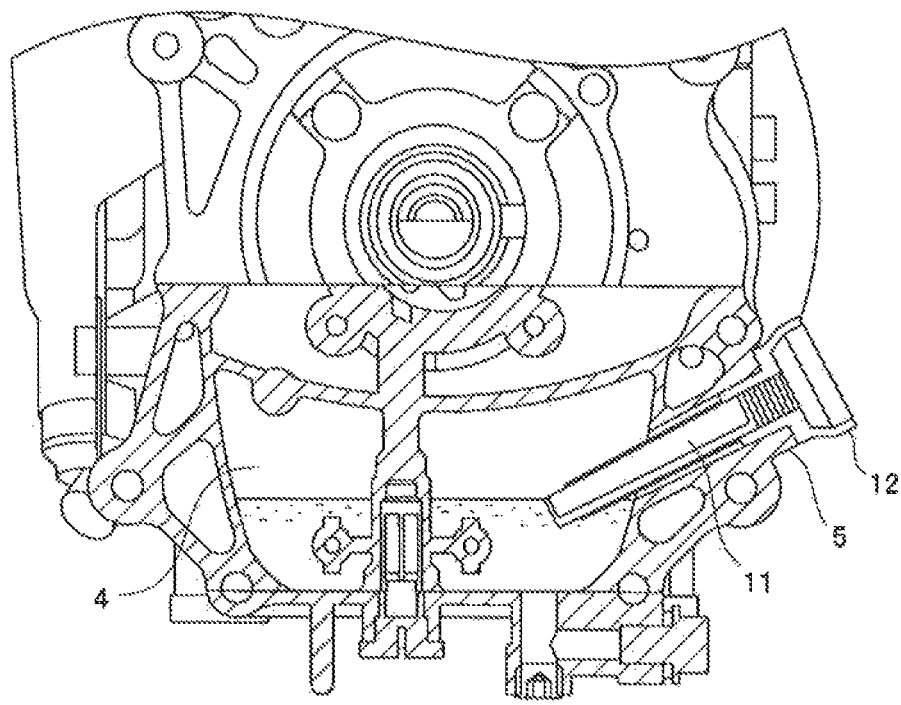
FIG. 5 is an explanatory diagram illustrating the position of a float when oil is at a lower limit.

If the oil storage amount is small and the oil level is at or below a specified lower-limit level, the downward force from the own weight of the float guide 12 becomes greater than the upward force by oil buoyancy, from among forces that act on the float 11 in the float guide 12, as illustrated in FIG. 5. As a result, a state is brought about where the float 11 sinks to the bottom face of the guide tube 13, and the top end of the float 11 does not protrude beyond the bottom face of the large-diameter portion 14.

Therefore, it becomes possible to easily grasp that the amount of oil has dropped down to a level that demands replenishment if visual checking reveals a state where the top end of the float 11 does not protrude beyond the bottom face of the large-diameter portion 14. Oil is replenished through removal of the float guide 12 from the oil filler neck 5, with the float 11 still accommodated in the float guide 12, so that workability is accordingly not impaired. Once oil replenishment is over, it suffices to attach the float guide 12, having the float 11 accommodated therein, to the oil filler neck 5, and plugging the float guide 12 with the float cap 17.

Figure 6:
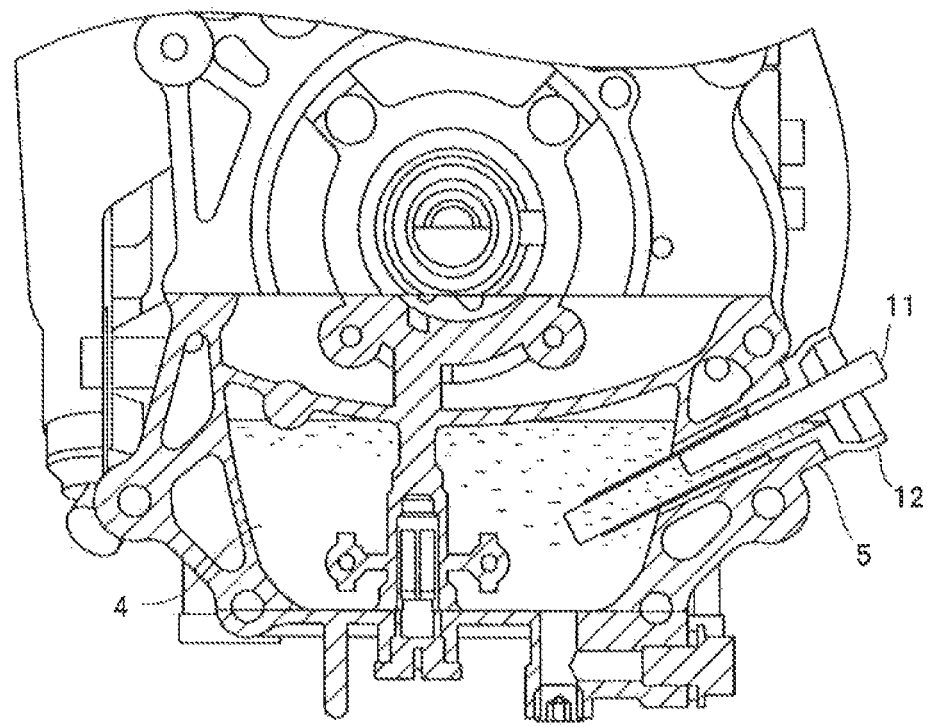
FIG. 6 is an explanatory diagram illustrating the position of a float when oil is at an upper limit.

By contrast, if a sufficient amount of oil is stored in the oil pan 4, the upward force from oil buoyancy is greater than the downward force of the own weight of the float 11, from among the forces that act on the float 11 in the float guide 12, as illustrated in FIG. 6. The float 11 thus protrudes beyond the large-diameter portion 14 upon removal of the float cap 17 from the float guide 12. It becomes therefore possible to check easily whether the amount of oil is sufficient through a simple glance of the protruding float 11.

Figure 7:
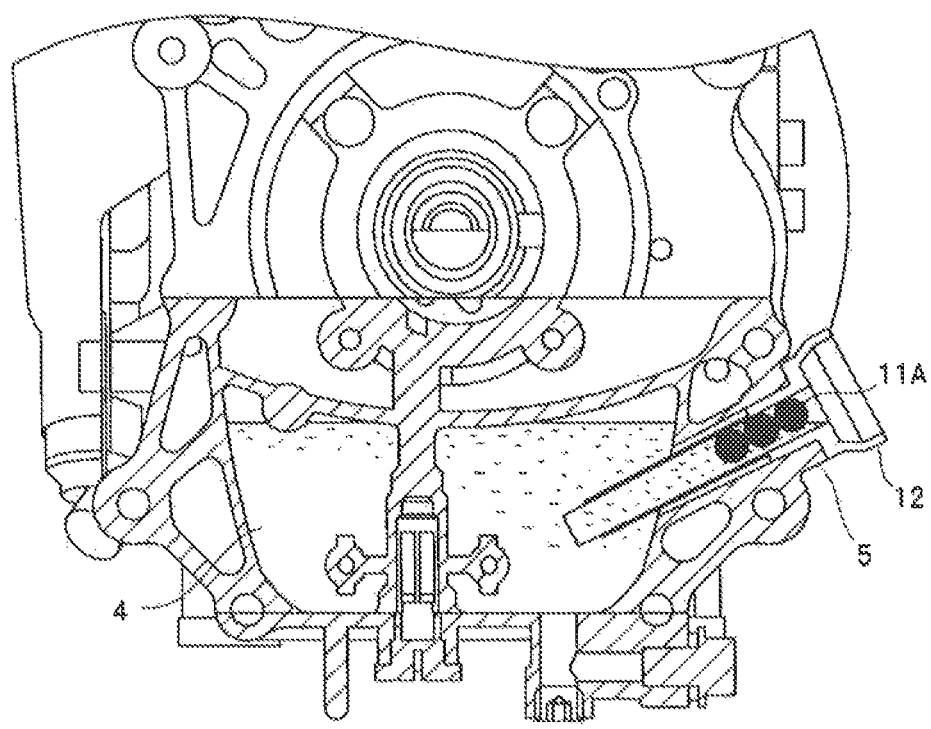
FIG. 7 is an explanatory diagram illustrating a variation of a float.

Resistance during motion of the float 11A can be reduced, and the oil level can be checked more reliably, in a case where the float 11 is a float 11A shaped in the form of a sphere, as illustrated in FIG. 7.

The present oil level display device 10, as a result, requires no complex operations, as in conventional instances, of checking the amount of oil by pulling the oil level gauge out, followed by wiping off of the oil and re-insertion of the oil level gauge; instead, the amount of oil can be checked by relying on an easy operation that is exclusively visual. Moreover, there is no need for removing the gauge from the oil filler neck 5, and hence it becomes possible to prevent waste from adhering or from dropping into the oil, and to prevent oil from dripping or soiling the surroundings of the engine. Adverse effects on the environment are forestalled thereby.

In conventional oil level gauges where oil level is assessed based on the oil adhesion position, concerns arise in that in some instances it may be difficult to recognise the boundary of adhesion, depending on the oil adhesion state, as well as concerns of misreading due to contact to the wall face of the gauge. In the oil level display device 10, however, such concerns are dispelled, and the oil level can be reliably assessed.

Further, the oil level display device 10 can easily replace a conventional oil level gauge. As a result, increases in cost are curtailed, and it becomes this possible to avoid layout issues associated with engine mounting. Further, the float guide 12 relies on a simple configuration for holding the float. As a result, it becomes possible to avoid malfunctions, even when using a utility engine in harsh usage environments that involve vibration or the like.

The invention claimed is:
1. An oil level display device of an engine, comprising:
a float that moves up and down in accordance with an oil level of oil stored in an oil pan of the engine;
a float guide having a housing unit for housing the float, the float guide being removably attachable to a filler neck of the engine that allows for replenishing oil into the oil pan, the housing unit constituting a motion guide for the up-and-down motion of the float, the float guide being held in a fixed position when attached to the filler neck to thereby support the up-and-down motion of the float; and a float cap that is attachable to the float guide to plug an upper opening of the housing unit, wherein a leading end of the housing unit is provided with an opening through which dropping of the float is prevented while permitting introduction of oil into the oil pan, and the float guide has an engaging member for releasably engaging with the filler neck.

2. The oil level display device of an engine according to claim 1, wherein a position of a top end of the float, when the float guide is attached to the filler neck and the float cap is removed from the float guide, is indicative whether replenishment of oil is necessary.

3. The oil level display device of an engine according to claim 2, wherein the float guide has, at a top of the housing unit, a large-diameter portion that constitutes a grip for attaching and detaching the float guide to and from the filler neck.

4. The oil level display device of an engine according to claim 3, wherein the float cap has a grip that protrudes beyond a top of the float guide.

5. The oil level display device of an engine according to claim 3, wherein the float guide is dimensioned as to be interchangeable with a conventional oil filler cap that plugs the filler neck.

6. The oil level display device of an engine according to claim 3, wherein the float is in the form of one or multiple spherical shapes.

7. The oil level display device of an engine according to claim 3, wherein
the float guide has, at a top of the housing unit, a large-diameter portion that has a larger diameter than a diameter of the housing unit, and
a protruding state of the top end of the float relative to the large-diameter portion, when the float cap is removed from the large-diameter portion, is indicative whether replenishment of oil is necessary.

8. The oil level display device of an engine according to claim 2, wherein the float cap has a grip that protrudes beyond a top of the float guide.

9. The oil level display device of an engine according to claim 2, wherein the float guide is dimensioned as to be interchangeable with a conventional oil filler cap that plugs the filler neck.

10. The oil level display device of an engine according to claim 2, wherein the float is in the form of one or multiple spherical shapes.

11. The oil level display device of an engine according to claim 2, wherein
the float guide has, at a top of the housing unit, a large-diameter portion that has a larger diameter than a diameter of the housing unit, and
a protruding state of the top end of the float relative to the large-diameter portion, when the float cap is removed from the large-diameter portion, is indicative whether replenishment of oil is necessary.

12. The oil level display device of an engine according to claim 1, wherein the float guide has, at a top of the housing unit, a large-diameter portion that constitutes a grip for attaching and detaching the float guide to and from the filler neck.

13. The oil level display device of an engine according to claim 12, wherein the float cap has a grip that protrudes beyond a top of the float guide.

14. The oil level display device of an engine according to claim 12, wherein the float guide is dimensioned as to be interchangeable with a conventional oil filler cap that plugs the filler neck.

15. The oil level display device of an engine according to claim 12, wherein the float is in the form of one or multiple spherical shapes.

16. The oil level display device of an engine according to claim 12, wherein
the float guide has, at the top of the housing unit, a large-diameter portion that has a larger diameter than a diameter of the housing unit, and
a protruding state of a top end of the float relative to the large-diameter portion, when the float cap is removed from the large-diameter portion, is indicative whether replenishment of oil is necessary.

17. The oil level display device of an engine according to claim 1, wherein the float cap has a grip that protrudes beyond a top of the float guide.

18. The oil level display device of an engine according to claim 1, wherein the float guide is dimensioned as to be interchangeable with a conventional oil filler cap that plugs the filler neck.

19. The oil level display device of an engine according to claim 1, wherein the float is in the form of one or multiple spherical shapes.

20. The oil level display device of an engine according to claim 1, wherein
the float guide has, at a top of the housing unit, a large-diameter portion that has a larger diameter than a diameter of the housing unit, and
a protruding state of a top end of the float relative to the large-diameter portion, when the float cap is removed from the large-diameter portion, is indicative whether replenishment of oil is necessary.

* * * * *